United States Patent
Miyazawa (10) Patent No.: US 10,781,894 B2
(45) Date of Patent: Sep. 22, 2020

(54) TENSIONER

(71) Applicant: TSUBAKIMOTO CHAIN CO., Osaka-shi, Osaka (JP)

(72) Inventor: Toshihiko Miyazawa, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 265 days.

(21) Appl. No.: 16/029,089

(22) Filed: Jul. 6, 2018

(65) Prior Publication Data
US 2019/0011022 A1      Jan. 10, 2019

(30) Foreign Application Priority Data

Jul. 7, 2017  (JP) .................. 2017-133976

(51) Int. Cl.
| | |
|---|---|
| *F16H 7/08* | (2006.01) |
| *F16K 15/04* | (2006.01) |
| *F16K 27/02* | (2006.01) |

(52) U.S. Cl.
CPC ......... *F16H 7/0848* (2013.01); *F16K 15/044* (2013.01); *F16K 15/046* (2013.01); *F16K 27/0209* (2013.01); *F16K 27/0245* (2013.01); *F16H 2007/0812* (2013.01); *F16H 2007/0859* (2013.01); *F16H 2007/0872* (2013.01); *F16H 2007/0893* (2013.01)

(58) Field of Classification Search
CPC ..... F16H 2007/0859; F16H 2007/0806; F16H 2007/0812; F16H 7/0848; F16H 7/0836
USPC .......................................... 474/110
See application file for complete search history.

(56) References Cited

U.S. PATENT DOCUMENTS

| | | | | | |
|---|---|---|---|---|---|
| 4,792,322 | A | * | 12/1988 | Goppelt ............. | F16H 7/08 474/136 |
| 4,850,941 | A | * | 7/1989 | Sosson ............. | F16H 7/08 474/110 |
| 4,911,679 | A | * | 3/1990 | Inoue ............. | F16H 7/1236 474/110 |
| 4,963,121 | A | * | 10/1990 | Himura ............. | F16H 7/08 474/110 |
| 4,997,411 | A | * | 3/1991 | Breon ............. | F16F 1/08 474/110 |

(Continued)

FOREIGN PATENT DOCUMENTS

| | | |
|---|---|---|
| JP | H06-37628 U | 5/1994 |
| JP | 3933634 B2 | 6/2007 |
| JP | 2016-102534 A | 6/2016 |

*Primary Examiner* — Henry Y Liu
(74) *Attorney, Agent, or Firm* — Westerman, Hattori, Daniels & Adrian, LLP (57) ABSTRACT

To provide a tensioner that improves, with a simple structure, maintenance operation efficiency, as well as enhances the sealing performance and the degree of freedom of check valve design. Either a plunger or a housing has a valve setting hole for disposing a check valve therein, and a valve movement restricting part that restricts movement of the check valve, disposed in the valve setting hole, toward an oil supply passage. A coil spring includes a small-diameter part and a large-diameter part continuous with the small-diameter part and disposed in contact with the check valve. The coil spring is disposed so as to urge the check valve toward the oil supply passage. The largest diameter of the large-diameter part is set larger than the inner diameter of the valve setting hole.

6 Claims, 8 Drawing Sheets

(56) References Cited

U.S. PATENT DOCUMENTS

| | | | | |
|---|---|---|---|---|
| 5,304,099 A | * | 4/1994 | Deppe | F16H 7/0848 474/110 |
| 5,352,159 A | * | 10/1994 | Suzuki | F16H 7/08 474/110 |
| 5,704,860 A | * | 1/1998 | Stief | F16H 7/08 474/110 |
| 5,961,410 A | * | 10/1999 | Yamamoto | F01L 1/02 474/110 |
| 6,045,471 A | * | 4/2000 | Suzuki | F16H 7/08 474/109 |
| 6,086,497 A | * | 7/2000 | Fukuda | F16H 7/0836 474/101 |
| 6,126,563 A | * | 10/2000 | Simpson | F16H 7/0836 474/109 |
| 6,602,154 B1 | * | 8/2003 | Guichard | F16H 7/08 474/101 |
| 7,001,295 B2 | * | 2/2006 | Hashimoto | F16H 7/0848 474/109 |
| 7,037,229 B2 | * | 5/2006 | Hayakawa | F01L 1/024 474/110 |
| 7,351,170 B2 | * | 4/2008 | Namie | F16H 7/0848 474/110 |
| 7,513,842 B2 | * | 4/2009 | Yoshida | F16H 7/0836 474/110 |
| 7,918,754 B2 | * | 4/2011 | Kurematsu | F16H 7/0848 474/110 |
| 7,927,242 B2 | * | 4/2011 | Namie | F16H 7/0848 474/101 |
| 8,007,384 B2 | * | 8/2011 | Kurematsu | F16H 7/0836 474/110 |
| 8,137,224 B2 | * | 3/2012 | Emizu | F16H 7/0836 474/110 |
| 8,221,274 B2 | * | 7/2012 | Sato | F16H 7/0836 474/109 |
| 8,323,135 B2 | * | 12/2012 | Namie | F16H 7/0836 474/110 |
| 8,574,106 B2 | * | 11/2013 | Botez | F16H 7/0848 474/110 |
| 8,585,519 B2 | * | 11/2013 | Hartmann | F16H 7/0836 474/110 |
| 8,939,856 B2 | * | 1/2015 | Kurematsu | F16H 7/0836 474/101 |
| 9,303,735 B2 | * | 4/2016 | Kurematsu | F16H 7/08 |
| 9,541,174 B2 | * | 1/2017 | Kurematsu | F16H 7/08 |
| 9,702,441 B2 | * | 7/2017 | Kurematsu | F16H 7/08 |
| 10,030,744 B2 | * | 7/2018 | Watanabe | F16H 7/0848 |
| 10,041,571 B2 | * | 8/2018 | Kitamura | F16H 7/08 |
| 2001/0016530 A1 | * | 8/2001 | Grunke | F01L 1/024 474/110 |
| 2005/0197223 A1 | * | 9/2005 | Namie | F16H 7/0848 474/110 |
| 2005/0265856 A1 | * | 12/2005 | Yoshida | F16H 7/0836 417/362 |
| 2014/0200104 A1 | * | 7/2014 | Kurematsu | F16H 7/08 474/110 |
| 2015/0267789 A1 | * | 9/2015 | Kurematsu | F16H 7/08 474/110 |
| 2015/0292602 A1 | * | 10/2015 | Kurematsu | F16H 7/0848 474/110 |
| 2016/0153530 A1 | * | 6/2016 | Kitamura | F16H 7/08 474/110 |

* cited by examiner

RELATED ART

FIG. 5B

RELATED ART

FIG. 5C

RELATED ART

FIG. 6

RELATED ART

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner that maintains appropriate tension in a chain or the like. For example, a known chain guide mechanism uses a tensioner to urge a tensioner lever for slidably guiding a drive chain, such as an endless roller chain passing over respective sprockets of a crankshaft and a cam shaft inside an engine room, to maintain appropriate tension of the drive chain or the like (Japanese Patent Application Laid-open No. 2016-102534).

Figure 5A:
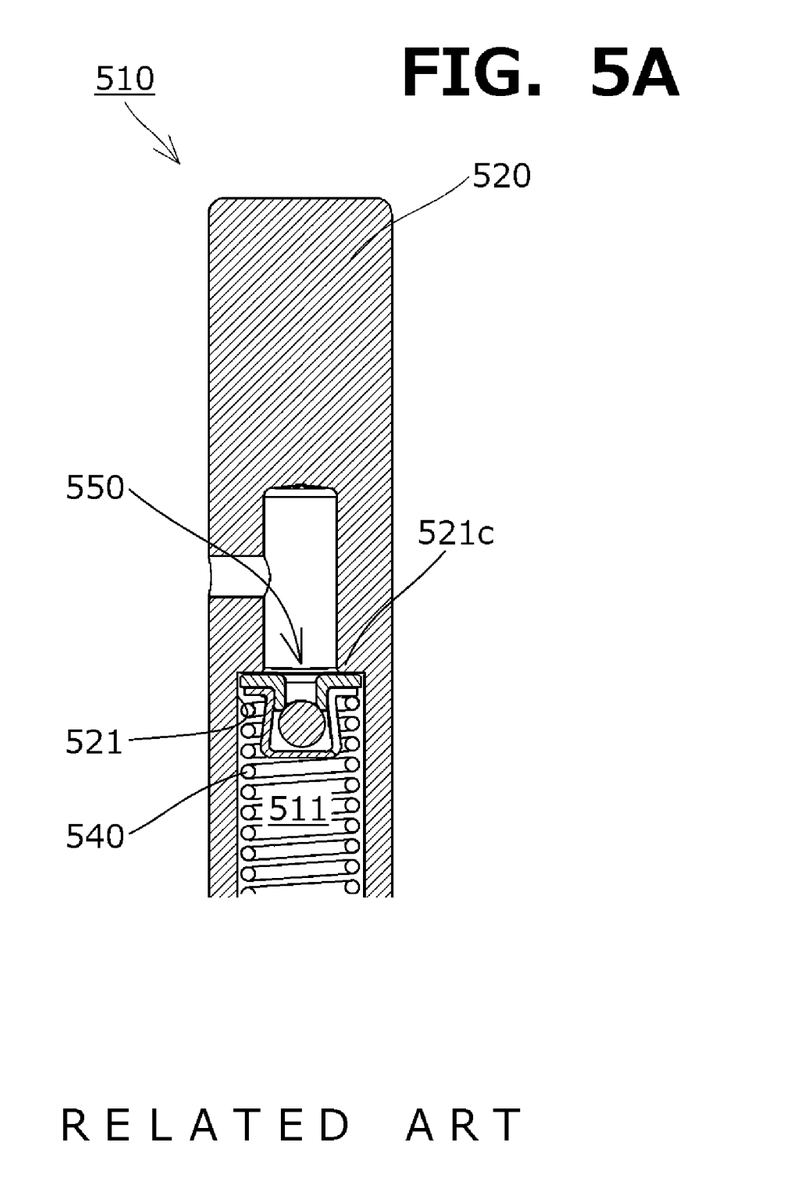
FIG. 5A is an illustrative diagram for explaining a problem in a tensioner of related art.

The tensioner 510 of Japanese Patent Application Laid-open No. 2016-102534 includes, as shown in FIG. 5A, a plunger 520 having a plunger hole 521 that is open on a rear side, a housing (not shown) having a plunger accommodating hole open on a front side for accommodating the plunger 520, a coil spring 540 accommodated inside an oil pressure chamber 511 formed between the plunger 520 and the plunger accommodating hole so as to be able to expand and contract and to urge the plunger 520 toward a front side, an oil supply passage for supplying oil from outside the housing into the oil pressure chamber 511, and a check valve 550 that allows the oil to flow from the oil supply passage into the oil pressure chamber 511 and prevents the oil from flowing out from the oil pressure chamber 511 to the oil supply passage.

In this tensioner 510, as shown in FIG. 5A, the check valve 550 is restricted from moving toward the front side by a stepped portion 521c formed on the inner circumferential wall of the plunger hole 521, and is urged toward the front side by the coil spring 540, so that the check valve 550 is retained at a predetermined position.

SUMMARY OF THE INVENTION

Figure 5B:
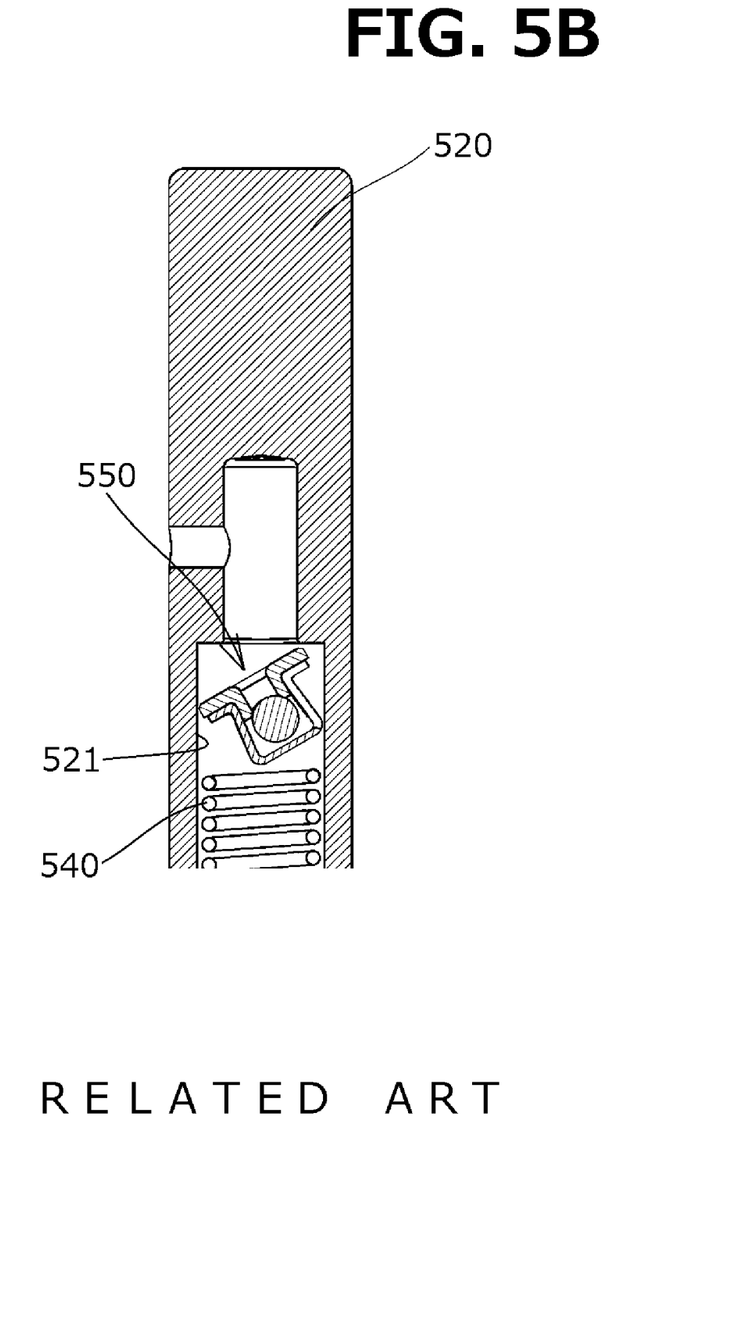
FIG. 5B is an illustrative diagram for explaining a problem in a tensioner of related art.

However, since the check valve 550 is retained at a predetermined position by the pressing force of the coil spring 540 in the tensioner 510 described in Japanese Patent Application Laid-open No. 2016-102534, when the plunger 520 is removed from the housing for the maintenance of the tensioner 510, the check valve 550 may tip inside the plunger hole 521 as shown in FIG. 5B, or the check valve 550 may fall out of the plunger hole 521. Consequently, there were problems that the operation efficiency of maintenance was reduced, and that sometimes the check valve 550 could be lost.

Figure 5C:
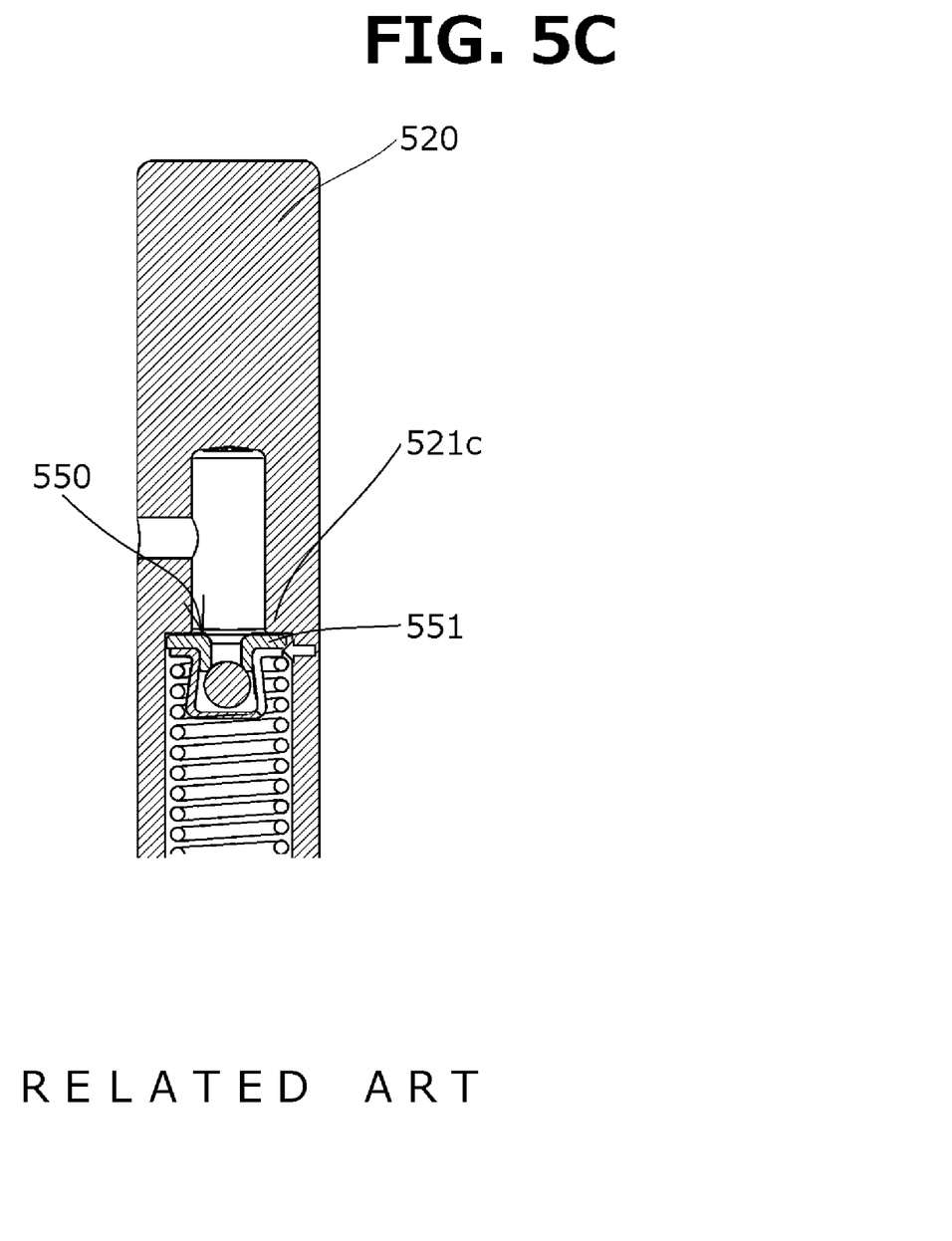
FIG. 5C is an illustrative diagram for explaining a problem in a tensioner of related art.

Moreover, in this tensioner 510, a seat member 551 of the check valve 550 is pressed by the coil spring 540 against the stepped portion 521c as shown in FIG. 5A so as to provide a seal between the seat member 551 and the stepped portion 521c. However, when there is a radial gap between the plunger hole 521 and the check valve 550 as shown in FIG. 5C, the check valve 550 may be radially displaced to one side relative to the plunger 520, in which case the contact surfaces between the seat member 551 and the stepped portion 521c become uneven in the circumferential direction and the sealing performance may be deteriorated.

Figure 6:
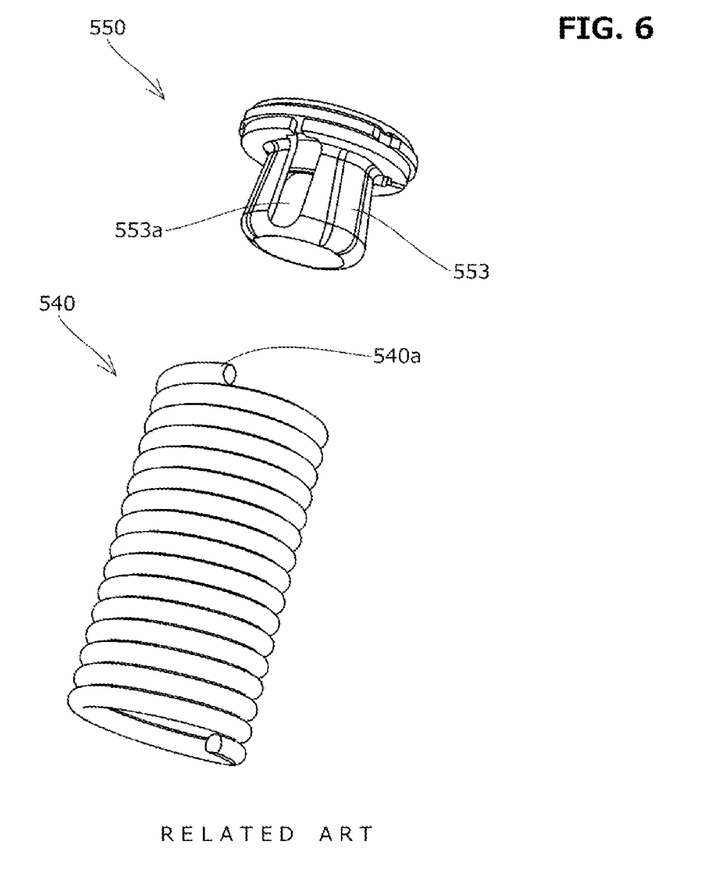
FIG. 6 is a perspective view for explaining a problem in a tensioner of related art.

Depending on the form of the check valve 550, the distal end 540a of the coil spring 540 may get caught on part of the check valve 550 (e.g., a slit 553a formed in the retainer 553 of the check valve 550 in the example of FIG. 6) when implementing assembly to the tensioner 510, which may possibly cause a failure in the coil spring 540 or check valve 550 such as deformation. To avoid such a circumstance, the check valve 550 need to be designed in such a form that the distal end 540a of the coil spring 540 will not get caught on the check valve 550, which led to the problem of limited degree of design freedom of the check valve 550.

The present invention solves these problems and it is an object of the invention to provide a simple-structured tensioner that improves maintenance operation efficiency as well as improves the sealing performance and the degree of freedom of check valve design.

To solve the problems described above, the present invention provides a tensioner including: a plunger having a plunger hole that is open on a rear side; a housing having a plunger accommodating hole that is open on a front side and accommodates the plunger; a coil spring accommodated inside an oil pressure chamber formed between the plunger and the plunger accommodating hole so as to be able to expand and contract and to urge the plunger toward the front side; an oil supply passage for supplying oil from outside the housing into the oil pressure chamber; and a check valve allowing oil to flow from the oil supply passage into the oil pressure chamber and preventing the oil from flowing out from the oil pressure chamber to the oil supply passage, either the plunger or the housing having a valve setting hole for disposing the check valve therein, and a valve movement restricting part restricting movement of the check valve, disposed in the valve setting hole, toward the oil supply passage. The coil spring includes a small-diameter part and a large-diameter part continuous with the small-diameter part and disposed in contact with the check valve. The coil spring is disposed so as to urge the check valve toward the oil supply passage. A largest diameter in the large-diameter part in a portion that is disposed inside the valve setting is set larger than an inner diameter of the valve setting hole.

According to one aspect of the present invention, the coil spring includes a small-diameter part and a large-diameter part formed on one side that is disposed in contact with the check valve. The largest diameter of the large-diameter part in a portion disposed inside the valve setting hole is set larger than the inner diameter of the valve setting hole. This way, with the coil spring assembled in the valve setting hole, the large-diameter part of the coil spring can be resiliently deformed so as to be radially compressed inside the valve setting hole, and thus the check valve and coil spring can be retained relative to the plunger or housing where the valve setting hole is formed. This prevents the check valve from tipping or dropping out during the maintenance of the tensioner when the plunger is taken out of the housing, so that reduction of the maintenance operation efficiency and possible loss of the check valve can be avoided.

Moreover, by retaining and uniting the check valve and coil spring to the plunger or housing, assembling operation and transportation of the tensioner are made easier, and assembling facilities can be made simpler, as well as the performance of the seal between the contact surfaces of the check valve and the valve movement restricting part can be maintained favorably.

Since the large-diameter part is formed on the side that is disposed in contact with the check valve, the distal end of the coil spring will not get caught on the check valve, and even when there is a radial gap between the valve setting hole and the check valve, the coil spring can guide the check valve to a center position inside the valve setting hole to make the check valve and the valve movement restricting part contact each other circumferentially uniformly, so that the seal between the contact surfaces of the check valve and the valve movement restricting part can exhibit a favorable function. Since the largest diameter of the large-diameter part is set larger than the inner diameter of the valve setting hole, there is no gap between the large-diameter part of the coil spring and the valve setting hole. The coil spring is therefore unlikely to be displaced radially inside the valve setting hole, so that the coil spring can reliably guide the check valve to the center position inside the valve setting hole.

Since the large-diameter part is formed on the side that is disposed in contact with the check valve to prevent the distal end of the coil spring from getting caught on the check valve, there is no need to consider the risk of the distal end of the coil spring getting caught on the check valve, so that the degree of design freedom of the check valve is increased.

According to another aspect of the present invention, the large-diameter part is formed to increase in diameter in a direction away from the small-diameter part. Even when there is a radial gap between the valve setting hole and the check valve, the coil spring can smoothly guide the position of the check valve to the center of the valve setting hole.

According to yet another aspect of the present invention, a part of the small-diameter part is disposed on the radially outer side of the check valve, so that the small-diameter part can reliably guide the position of the check valve to the center of the valve setting hole.

DESCRIPTION OF THE PREFERRED EMBODIMENTS

A tensioner 10 according to a first embodiment of the present invention will be described below with reference to the drawings.

Figure 1:
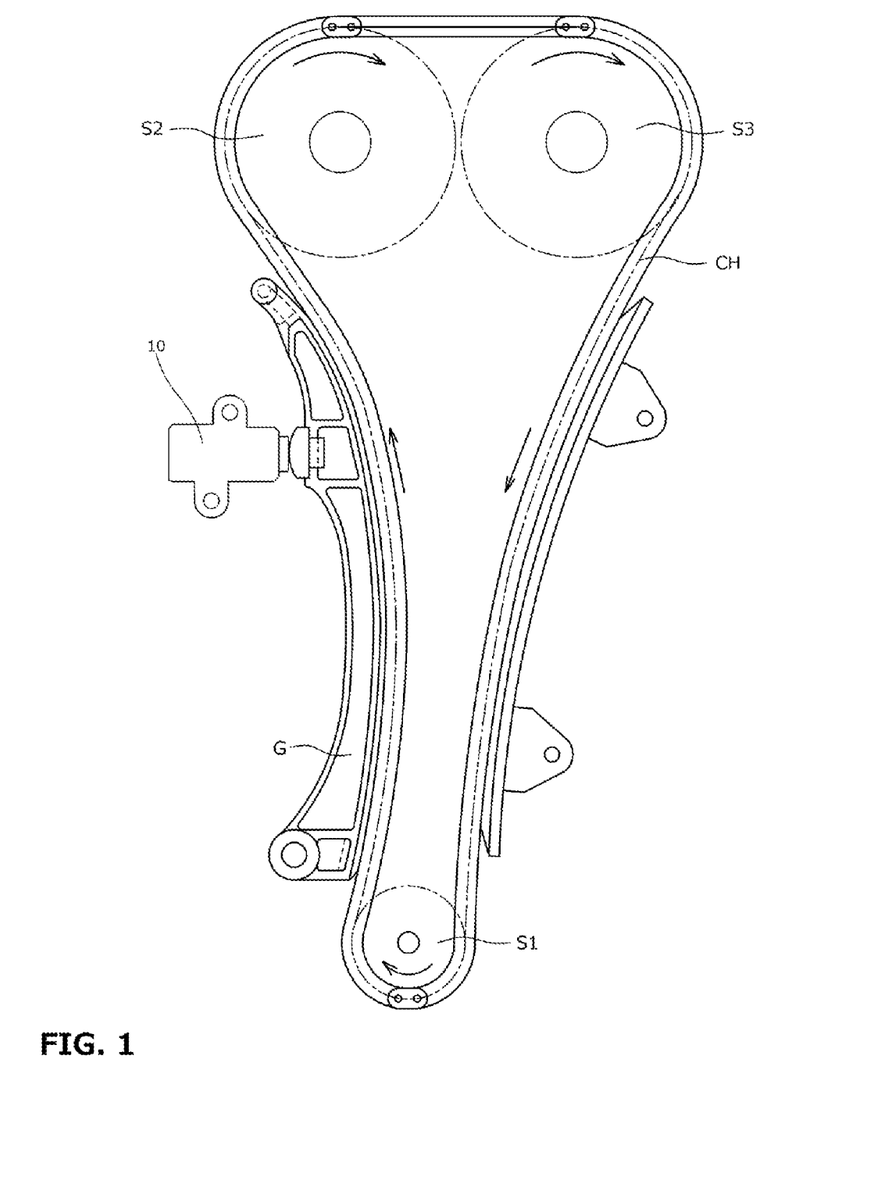
FIG. 1 is an illustrative diagram showing one form of a tensioner in use according to a first embodiment of the present invention.

First, the tensioner 10 of this embodiment is incorporated in a chain drive device used in a timing system or the like of a car engine. As shown in FIG. 1, the tensioner is attached to an engine block (not shown) to apply appropriate tension to the slack side of a drive chain CH passing over a plurality of sprockets S1 to S3 via a tensioner lever G to reduce vibration during the drive.

Figure 2:
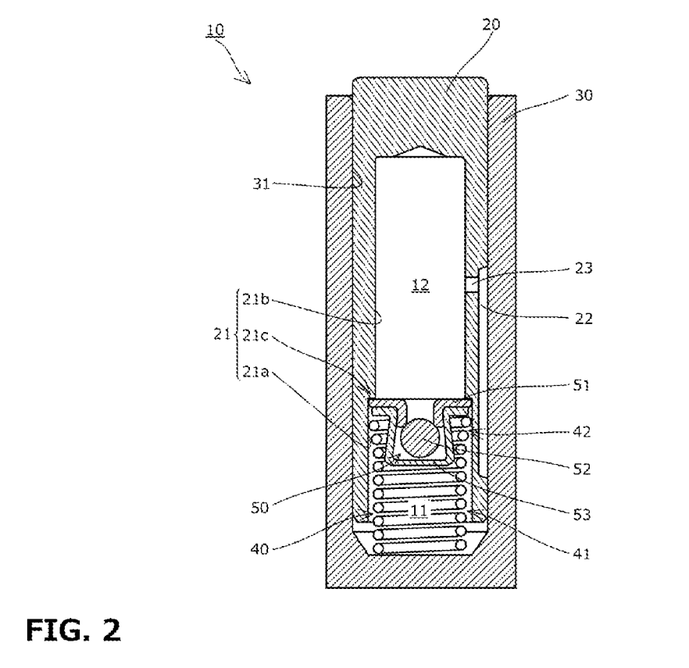
FIG. 2 is a cross-sectional view illustrating the tensioner according to the first embodiment.

The tensioner 10 includes, as shown in FIG. 2, a plunger 20 having a cylindrical plunger hole 21 that is open on the rear side, a housing 30 having a plunger accommodating hole 31 for accommodating the plunger 20, a coil spring 40 accommodated inside an oil pressure chamber 11 formed between the plunger accommodating hole 31 and the rear end of the plunger 20 so as to be able to expand and contract and to urge the plunger 20 toward the front side, an oil supply passage for supplying oil from outside the housing 30 into the oil pressure chamber 11, and a check valve 50 that allows the oil to flow from the oil supply passage into the oil pressure chamber 11 and prevents the oil from flowing out from the oil pressure chamber 11 to the oil supply passage.

An internal space formed between the housing 30 and the plunger 20 is divided by the check valve 50 set inside the plunger hole 21 into the oil pressure chamber 11 on the rear side and an oil reservoir chamber 12 on the front side.

Hereinafter, various constituent elements of the tensioner 10 will be described with reference to the drawings.

The plunger 20 is made of metal such as iron or the like in the form of a cylinder with a bottom and inserted in the plunger accommodating hole 31 so as to be able to move back and forth in the front to back direction, as shown in FIG. 2.

The plunger hole 21 of the plunger 20 includes a large-diameter hole 21a on the rear side, a small-diameter hole 21b on the front side continuously and coaxially famed on the front side of the large-diameter hole 21a, and a stepped portion 21c famed between these large-diameter hole 21a and small-diameter hole 21b as shown in FIG. 2.

A stepped portion 21c formed on the inner wall of the plunger hole 21 functions as a valve movement restricting part that restricts the movement of the check valve 50 disposed in a valve setting hole toward the side where there is an oil supply passage, as shown in FIG. 2.

A front-side portion of the large-diameter hole 21a that is a part of the plunger hole 21 functions as the valve setting hole, in which the check valve 50 (or at least a part thereof) is disposed.

The plunger 20 includes, as shown in FIG. 2, a connection/adjustment groove 22 formed in an outer circumferential surface thereof, and a plunger oil supply hole 23 for supplying oil from the connection/adjustment groove 22 into the small-diameter hole 21b (oil reservoir chamber 12).

The housing 30 is made of aluminum alloy or synthetic resin and the like, and has a housing oil supply hole (not shown) extending through between the outer circumferential surface and the inner circumferential surface of the housing 30 for supplying oil to the connection/adjustment groove 22.

These oil reservoir chamber 12, connection/adjustment groove 22, plunger oil supply hole 23, and housing oil supply hole (not shown) function as the oil supply passage that supplies oil from outside the housing 30 into the oil pressure chamber 11.

The connection/adjustment groove 22 may be formed at least in one of the outer circumferential surface of the plunger 20 and an inner circumferential surface of the plunger accommodating hole 31.

Figure 3:
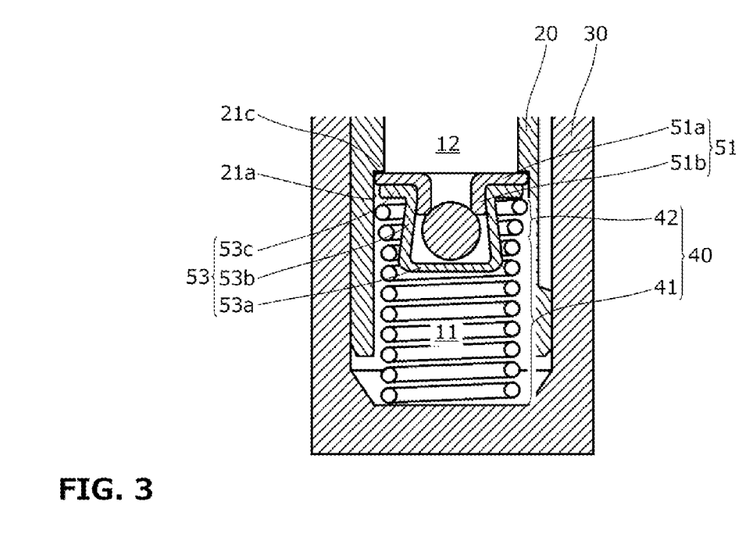
FIG. 3 is an illustrative diagram showing a coil spring and a check valve positioned at the center.

The coil spring 40 is set such that one end (front end) thereof abuts on the check valve 50 (flange part 53c of a retainer 53) and the other end (rear end) thereof is in contact with the bottom of the plunger accommodating hole 31, as shown in FIG. 2 and FIG. 3.

The coil spring 40 urges the plunger 20 toward the front side, as well as presses the check valve 50 (flange part 53c of the retainer 53 and a seat member 51) against the stepped portion 21c that functions as a valve movement restricting part, so as to retain the check valve 50 inside the large-diameter hole 21a, which functions as the valve setting hole, as shown in FIG. 2 and FIG. 3.

The coil spring 40 includes a small-diameter part 41 on the rear side, and a large-diameter part 42 on the front side continuous with the small-diameter part 41 and arranged in contact with the check valve 50 (flange part 53c of the retainer 53), as shown in FIG. 2 and FIG. 3.

Parts of the large-diameter part 42 and small-diameter part 41 are arranged on the radially outer side of the check valve 50.

The largest diameter of the large-diameter part 42 in a portion arranged inside the valve setting hole is set larger than the inner diameter of the large-diameter hole 21a that functions as the valve setting hole, so that the large-diameter part 42 set inside the large-diameter hole 21a is radially compressed, or resiliently deformed radially inward.

The large-diameter part 42 is formed such that the diameter thereof increases gradually toward the direction away from the small-diameter part 41 (toward the distal end), as shown in FIG. 2 and FIG. 3.

The check valve 50 is made up of a seat member 51, a ball-like valve member 52, the retainer 53 that restricts the movement of the valve member 52, and a spring (not shown) interposed between the valve member 52 and the retainer 53, as shown in FIG. 2 to FIG. 3.

The spring (not shown) is provided to urge the valve member 52 toward the seat member 51, but the spring (not shown) is not an essential component and may not necessarily be provided.

These components of the check valve 50 are made of metal or synthetic resin and the like.

The seat member 51 includes a disc-like base part 51a with a through hole, and a cylindrical seat part 51b protruding from the edge of the through hole of the base part 51a, as shown in FIG. 2 and FIG. 3.

The valve member 52 is in the form of a ball and arranged such that the member can sit on the distal end of the seat part 51b in tight contact therewith.

The retainer 53 includes a substantially disc-like top 53a disposed on the rear side of the valve member 52, a skirt 53b extending vertically toward the front side from the peripheral edge of the top 53a and arranged on the radially outer side of the seat part 51b, and the flange part 53c extending radially outward from the front end of the skirt 53b.

Slits (not shown) are famed at a plurality of circumferential locations in the skirt 53b and flange part 53c to extend from the rear end of the skirt 53b to the outer circumferential edge of the flange part 53c.

The seat part 51b and skirt 53b are reduced in diameter from the rear side toward the front side, the skirt 53b fitting on the seat part 51b on the radially outer side thereof.

The dimensions of the check valve 50, valve setting hole, and large-diameter part 42 relative to each other are set such that, with the check valve 50 disposed inside the valve setting hole, the distal end of the large-diameter part 42 does not contact the check valve 50 when the coil spring 40 is inserted into the valve setting hole.

Next, a tensioner 10 according to a second embodiment of the present invention will be described with reference to FIG. 4. The second embodiment is, in part, exactly the same as the previously described first embodiment, and therefore the description of its configurations other than the differences will be omitted.

Figure 4:
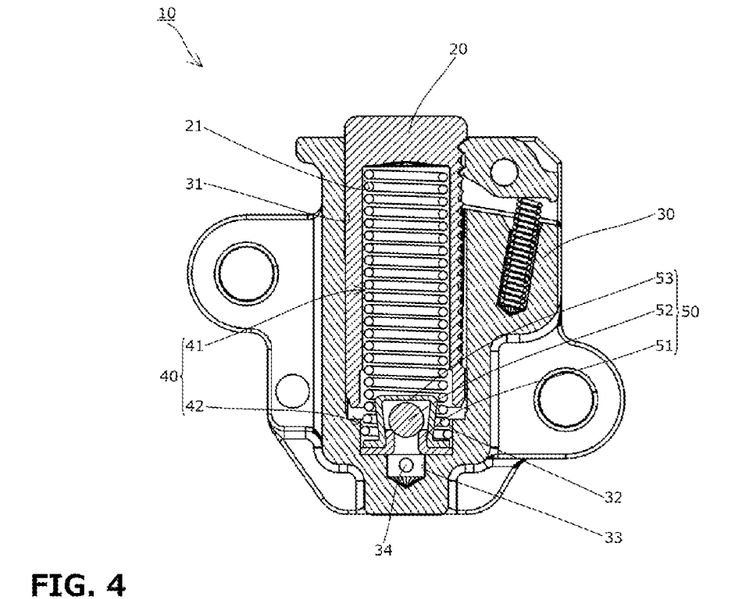
FIG. 4 is a cross-sectional view illustrating a plunger according to a second embodiment.

The plunger 20 of the second embodiment does not have the connection/adjustment groove 22 and plunger oil supply hole 23 of the first embodiment, as shown in FIG. 4.

The housing 30 of the second embodiment does not have the housing oil supply hole (not shown) of the first embodiment, as shown in FIG. 4.

The housing 30 of the second embodiment includes a plunger accommodating hole 31, a cylindrical setting hole 32 formed continuously with the plunger accommodating hole 31 on the rear side and having a smaller diameter than the plunger accommodating hole 31, a cylindrical small-diameter hole 33 formed continuously with the setting hole 32 on the rear side and having a smaller diameter than the setting hole 32, and a housing hole 34 extending through a rear-side bottom part of the housing 30 to connect the outside of the housing 30 with the plunger accommodating hole 31.

This housing hole 34 functions as an oil supply passage for supplying oil from the outside of the housing 30 into the oil pressure chamber 11.

In the first embodiment described above, the internal space famed between the housing 30 and the plunger 20 is divided by the check valve 50 into the rear-side oil pressure chamber 11 and the front-side oil reservoir chamber 12. In the second embodiment, as shown in FIG. 4, the oil reservoir chamber 12 of the first embodiment is not provided.

The check valve 50 of the second embodiment is disposed inside the setting hole 32 of the housing 30 such that its seat member 51 is oriented toward the rear side, as shown in FIG. 4.

Thus the setting hole 32 of the housing 30 functions as the valve setting hole in which the check valve 50 (or at least a part thereof) is disposed in the second embodiment.

The check valve 50 of the second embodiment is restricted by the bottom surface of the setting hole 32 from moving toward the oil supply passage as shown in FIG. 4. The bottom surface of the setting hole 32 thus functions as the valve movement restricting part in the second embodiment.

The coil spring 40 of the second embodiment is disposed such that its large-diameter part 42 is oriented toward the rear side, as shown in FIG. 4, and set such that the large-diameter part 42 that is one end thereof abuts on the check valve 50 (flange part 53c of the retainer 53), while the other end thereof is in contact with the bottom of the plunger hole 21 (a front-side part of the plunger 20).

The large-diameter part 42 (or at least a part thereof) is inserted in the setting hole 32 that functions as the valve setting hole, and resiliently defamed radially inward, or radially compressed, inside the setting hole 32.

While embodiments of the present invention have been described above in detail, the present invention is not limited to these embodiments and may be carried out with various design changes without departing from the scope of the present invention set forth in the claims.

For example, various configurations of the embodiments described above may be freely combined to form other tensioners.

While the tensioner was described as a component to be incorporated in a timing system of a car engine in the embodiments above, the purpose of use of the tensioner is not limited to this specific application.

Also, while the tensioner was described as a component that applies tension to a drive chain with a tensioner lever in the embodiments above, the plunger can directly guide the drive chain slidably with a distal end thereof to apply tension to the drive chain.

The tensioner may not necessarily be applied to a transmission mechanism with a drive chain but can also be used for similar transmission mechanisms that use belts, ropes and the like, and can be applied in a variety of industrial fields where it is required to apply tension to an elongated component.

While the housing accommodating the plunger is described as the component known as a tensioner body that is attached to an engine block or the like in the embodiments described above, the housing is not limited to the specific form described above and may be a cylindrical component known as a sleeve inserted into a body hole formed in the tensioner body.

While the coil spring is made up of a small-diameter part and a large-diameter part formed on one end of the small-diameter part in the embodiments described above, the coil spring is not limited to the specific form described above. For example, a large-diameter part may be formed on either end of the small-diameter part, which makes it unnecessary to consider the setting direction of the coil spring when implementing assembly to the tensioner.

While the large-diameter part is formed to increase in diameter in the direction away from the small-diameter part (toward the distal end) in the embodiments described above, the large-diameter part is not limited to the specific form described above. For example, the large-diameter part may be formed to increase in diameter, and then reduced in diameter, in the direction away from the small-diameter part.

While the large-diameter part is entirely disposed inside the valve setting hole in the first embodiment described above, only a part of the large-diameter part may be disposed inside the valve setting hole as in the second embodiment.

The valve setting hole and check valve are designed with a dimensional relationship such that there is hardly any radial gap between the valve setting hole and the check valve (seat member) in the embodiments described above. Alternatively, the valve setting hole and check valve may be designed such that there is a certain gap between the valve setting hole and the check valve.

What is claimed is:

1. A tensioner comprising: a plunger having a plunger hole that is open on a rear side; a housing having a plunger accommodating hole that is open on a front side and accommodates the plunger; a coil spring accommodated inside an oil pressure chamber formed between the plunger and the plunger accommodating hole so as to be able to expand and contract and to urge the plunger toward the front side; an oil supply passage for supplying oil from outside the housing into the oil pressure chamber; and a check valve allowing oil to flow from the oil supply passage into the oil pressure chamber and preventing the oil from flowing out from the oil pressure chamber to the oil supply passage, either the plunger or the housing including a valve setting hole for disposing the check valve therein, and a valve movement restricting part restricting movement of the check valve, disposed in the valve setting hole, toward the oil supply passage, the coil spring including a small-diameter part and a large-diameter part continuous with the small-diameter part and disposed in contact with the check valve, and the coil spring being disposed so as to urge the check valve toward the oil supply passage, and a largest diameter in the large-diameter part in a portion that is disposed inside the valve setting hole being set larger than an inner diameter of the valve setting hole.

2. The tensioner according to claim 1, wherein the large-diameter part is formed to increase in diameter in a direction away from the small-diameter part.

3. The tensioner according to claim 1, wherein a part of the small-diameter part is disposed on a radially outer side of the check valve.

4. The tensioner according to claim 1, wherein
   the valve setting hole is configured as a part of the plunger hole,
   the valve movement restricting part is formed on an inner wall of the plunger hole, and
   the coil spring is set such that the large-diameter part that is one end thereof is in contact with the check valve, while the other end is in contact with a bottom part of the plunger accommodating hole.

5. The tensioner according to claim 1, wherein
   the valve setting hole and the valve movement restricting part are formed in a bottom part of the plunger accommodating hole, and
   the coil spring is set such that the large-diameter part that is one end thereof is in contact with the check valve, while the other end is in contact with a bottom part of the plunger hole.

6. The tensioner according to claim 2, wherein a part of the small-diameter part is disposed on a radially outer side of the check valve.

* * * * *